United States Patent
Bohli et al.

(10) Patent No.: US 10,372,918 B2
(45) Date of Patent: Aug. 6, 2019

(54) METHOD FOR STORING A DATA FILE OF A CLIENT ON A STORAGE ENTITY

(71) Applicant: NEC Laboratories Europe GmbH, Heidelberg (DE)

(72) Inventors: Jens-Matthias Bohli, Leimen (DE); Ghassan Karame, Heidelberg (DE); Frederik Armknecht, Worms (DE)

(73) Assignee: NEC CORPORATION, Tokyo (JP)

( * ) Notice: Subject to any disclaimer, the term of this patent is extended or adjusted under 35 U.S.C. 154(b) by 176 days.

(21) Appl. No.: 15/550,373

(22) PCT Filed: Feb. 13, 2015

(86) PCT No.: PCT/EP2015/053130
§ 371 (c)(1),
(2) Date: Aug. 11, 2017

(87) PCT Pub. No.: WO2016/128070
PCT Pub. Date: Aug. 18, 2016

(65) Prior Publication Data
US 2018/0025167 A1    Jan. 25, 2018

(51) Int. Cl.
*G06F 21/60*    (2013.01)
*G06F 21/62*    (2013.01)
(Continued)

(52) U.S. Cl.
CPC ........ *G06F 21/602* (2013.01); *G06F 21/6218* (2013.01); *H04L 9/0643* (2013.01);
(Continued)

(58) Field of Classification Search
CPC ............... G06F 21/602; G06F 21/6218; H04L 63/0281; H04L 9/14; H04L 9/0463; H04L 9/0861
See application file for complete search history.

(56) References Cited

U.S. PATENT DOCUMENTS 8,281,143 B1    10/2012    Clifford et al.
8,528,085 B1 *   9/2013    Juels ........................ G06F 16/13
                                                                     726/22
(Continued)

OTHER PUBLICATIONS

Prajapati et al.; "Efficient cross user Data Deduplication in Remote Data Storage", 2014, IEEE, pp. 1-5. (Year: 2014).*

(Continued)

*Primary Examiner* — Matthew Smithers
(74) *Attorney, Agent, or Firm* — Leydig, Voit & Mayer, Ltd.

(57) ABSTRACT

A method for storing a data file of a client on a storage entity includes generating, by a proxy entity, a master encryption key; encrypting, by the client, the data file using the master encryption key to produce an encrypted file; computing a hash-tree for the encrypted file and using a top-hash of the hash-tree as a file identification (FID); and determining, by the proxy entity, whether the FID is already known to the storage entity. If the FID is not already known to the storage entity the method further includes computing, by the proxy entity, a top-hash of the encrypted file (PFID), and when the ownership of the data file has been proven, storing the FID being equal with the PFID at the client together with the hash value.

15 Claims, 1 Drawing Sheet

(51) Int. Cl.
*H04L 9/06* (2006.01)
*H04L 9/08* (2006.01)
*H04L 9/14* (2006.01)
*H04L 29/06* (2006.01)

(52) U.S. Cl.
CPC ............... *H04L 9/0861* (2013.01); *H04L 9/14* (2013.01); *H04L 63/0281* (2013.01)

(56) References Cited

U.S. PATENT DOCUMENTS

| | | | |
|---|---|---|---|
| 9,076,004 B1* | 7/2015 | Bogorad | G06F 21/602 |
| 2010/0211781 A1* | 8/2010 | Auradkar | G06F 21/6209 |
| | | | 713/168 |
| 2016/0077977 A1* | 3/2016 | Narayanamurthy | H04L 9/3242 |
| | | | 713/193 |
| 2017/0208043 A1* | 7/2017 | Bohli | G06F 3/0608 |

OTHER PUBLICATIONS

Du et al.; "Proofs of Ownership and Retrievability in Cloud Storage", 2014, IEEE, pp. 328-335. (Year: 2014).*

Jin et al.; "Anonymous Deduplication of Encrypted Data with Proof of Ownership in Cloud Storage", 2013, IEEE, pp. 224-229. (Year: 2013).*

Halevi et al.; "Proofs of Ownership in Remote Storage Systems", 2011, ACM, pp. 491-500. (Year: 2011).*

Yang et al.; "Provable Ownership of File in De-duplication Cloud Storage", 2013, IEEE, pp. 695-700. (Year: 2013).*

Rashid et al.; "Proof of Retrieval and Ownership Protocols for Images through SPIHT Compression", 2014, IEEE, pp. 835-838. (Year: 2014).*

Blasco et al.; "A Tunable Proof of Ownership Scheme for Deduplication Using Bloom Filters", 2014, IEEE, pp. 481-489. (Year: 2014).*

Mizan et al.; "Accountable Proof of Ownership for Data using Timing Element in Cloud Services", 2013. IEEE, pp. 57-64. (Year: 2013).*

Zheng et al.; "Secure and Efficient Proof of Storage with Deduplication", 2012, ACM, pp. 1-11. (Year: 2012).*

Rashid et al.; "Secure Enterprise Data Deduplication in the Cloud", 2013, IEEE. pp. 367-374. (Year: 2013).*

Jia Xu et al: "Weak leakage-resilient client-side deduplication of encrypted data in cloud storage", Proceedings of the 8th ACM SIGSAC Symposium on Information, Computer and Communication Security, Asia CCS '13, Jan. 1, 2013 (Jan. 1, 2013), p. 195, XP055221792.

Mihir Bellare Sriram Keelveedhi University of California et al: "DupLESS: Server-Aided Encryption for Deduplicated Storage", USENIX Aug. 14, 2013 (Aug. 14, 2013), pp. 1-16, XP061014446.

* cited by examiner

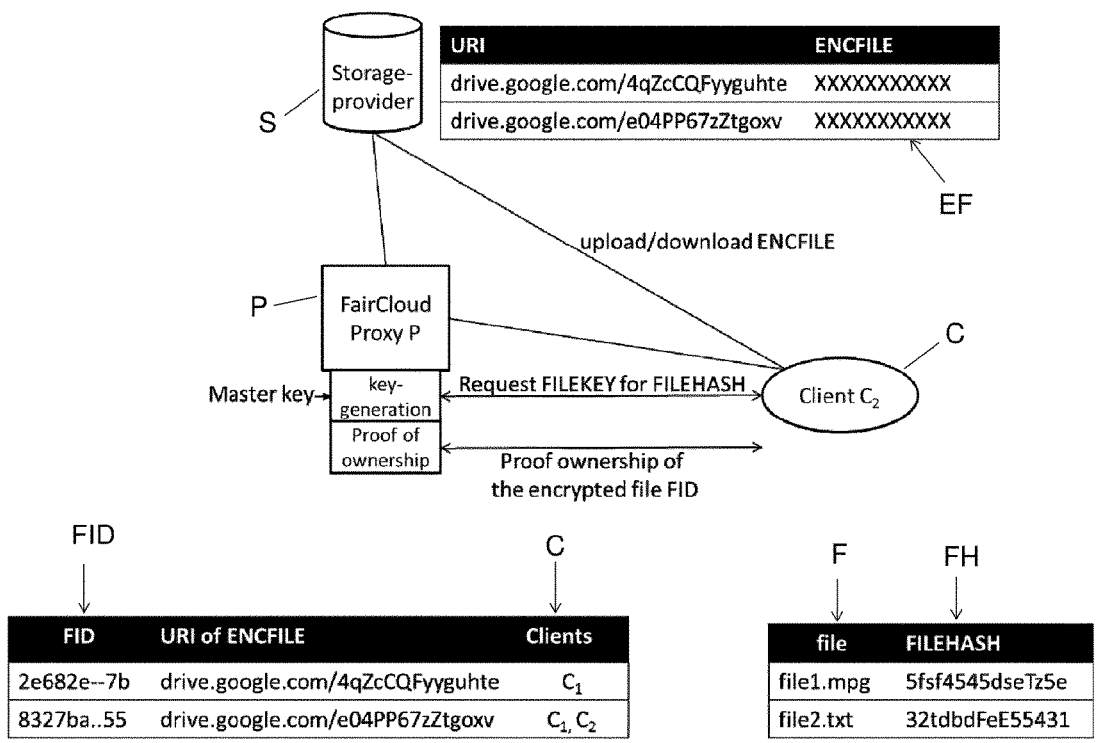

METHOD FOR STORING A DATA FILE OF A CLIENT ON A STORAGE ENTITY

CROSS REFERENCE TO RELATED APPLICATIONS

This application is a U.S. National Stage Application under 35 U.S.C. § 371 of International Application No. PCT/EP2015/053130 filed on Feb. 13, 2015. The International Application was published in English on Aug. 18, 2016 as WO 2016/128070 A1 under PCT Article 21(2).

FIELD

The present invention relates to a method for storing a data file of a client on a storage entity. The present invention further relates to a system for storing data of a client on a storage entity comprising a proxy entity. The present invention even further relates to a proxy entity connectable to a storage entity and a client.

BACKGROUND

Cloud storage is receiving increasing attention and importance recently. Cloud storage offers their users cost-effective, convenient and highly available storage services. Conventional clouds rely on cost-effective techniques such as data compression and data deduplication in order to save storage costs for the cloud.

Data deduplication clearly comes at odds with data confidentiality. That is, existing semantically secure encryption techniques render any two identical chunks of data indistinguishable to the cloud storage provider, thus preventing the cloud storage provider from effectively deduplicating data.

In the non-patent literature of Pasquale Puzio, Refik Molva, Melek Önen and Sergio Loureira *ClouDedup: Secure Deduplication with Encrypted Data for Cloud Storage, Proceedings of IEEE CloudCom* 2013, A Secure Data Deduplication Scheme for Cloud Storage, Jan Stanek, Alessandro Sorniotti, Elli Androulaki, and Lukas Kenc, Proceedings of Financial Cryptography and Data Security, 2014, Boosting Efficiency and Security in Proof of Ownership for Deduplication, Roberto Di Pietro, Alessandro Sorniotti, Proceedings of ASIACCS 2012, and Mihir Bellare and Sriram Keelveedhi, Thomas Ristenpart, DupLESS: Server-Aided Encryption for Deduplicated Storage, Proceedings of Usenix Security 2013, techniques are disclosed for performing deduplication over encrypted data or for a construction for a proof of ownership to attest that a user indeed possesses a file which is deduplicated by a cloud for example. These conventional techniques do not efficiently protect against malicious users to abuse the system, e.g., upload data encrypted with the wrong encryption key, etc.

However one of the disadvantages is, that these techniques are not transparent for the users of a cloud storage provider. Another disadvantage is, that the users do not have a fine-grained control over their possibly deduplicated files.

SUMMARY

In an embodiment, the present invention provides a method for storing a data file of a client on a storage entity. The method includes generating, by a proxy entity, a master encryption key, wherein the master encryption key is a deterministic function of the data file based on a hash value of a hash-function performed on the data file. The method further includes encrypting, by the client, the data file using the master encryption key to produce an encrypted file, computing a hash-tree for the encrypted file and using a top-hash of the hash-tree as a file identification (FID) for the encrypted file, and determining, by the proxy entity, whether the FID is already known to the storage entity. If the FID is not already known to the storage entity the method further includes uploading, by the client, the encrypted file to the storage entity and to the proxy entity, computing, by the proxy entity, a top-hash of the encrypted file (PFID), performing a proof-of-ownership procedure for the encrypted data file to be stored by comparing the FID with the PFID, and when the ownership of the data file has been proven, storing the FID being equal with the PFID at the client together with the hash value. If the FID is already known to the storage entity, the method further includes performing a proof-of-ownership-procedure for the encrypted data file to be stored by comparing the FID with a prior computed FID, and when the ownership of the data file has been proven, storing the FID at the client together with the hash value.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE shows a system according to an embodiment of the present invention.

DETAILED DESCRIPTION

A method and a system for storing a data file of a client on a storage entity are described herein which support strong confidentiality and resistance against malicious users who might, e.g., wrongfully acquire file hashes, and which provide a fine-grained access control over files.

A method and a system for storing a data file of a client on a storage entity are described herein which are easy to implement.

Furthermore, a method and a system for storing a data file of a client on a storage entity are described herein which enable a scaling with the number of users, file sizes, etc. and without deteriorating the performance witnessed by users and compared to conventional methods and systems.

Although applicable to storage in general, the present invention will be described with regard to cloud storage.

Although applicable to any kind of data reducing technique, the present invention will be described with regard to deduplication over encrypted data.

According to an embodiment, a method is provided, the method characterized in that:

a) a master encryption key is generated by a proxy entity wherein the master encryption key is a deterministic function of the data file to be stored based on a hash value of a hash-function performed on the data file to be stored by said client, b) said data file to be stored is encrypted by the client, using the provided master encryption key, c) a hash-tree for the encrypted file is computed and the top-hash of the computed hash-tree is used as file identification—FID—for the encrypted file, d) the proxy entity checks whether the FID is already known to the storage entity or not and e) in case the FID is not known, the client uploads the encrypted file to the storage entity and to the proxy entity, f) the proxy entity computes a top-hash of the encrypted file—PFID—in case the FID is not known or uses a prior computed FID in case the FID is known and performs a proof-of-ownership-procedure for the encrypted data file to be stored by comparing the FID with the PFID or the prior computed FID and when the ownership of the data file has been proven, the FID being equal with the PFID is stored on the client together with said hash value.

According to an embodiment, a system is provided, the system characterized by a proxy entity adapted to generate a master encryption key, wherein the master encryption key is a deterministic function of the data file to be stored based on a hash value of a hash-function performed on the data file to be stored by said client, said client is adapted to encrypt said data file to be stored using the provided master encryption key, and to compute a hash-tree for the encrypted file and said proxy entity is adapted to receive the top-hash of the computed hash-tree as file identification—FID—for the encrypted file, to check whether the FID is already known to the storage entity or not, in case the FID is not known, the client is adapted to upload the encrypted file to the storage entity and to the proxy entity, and wherein the proxy entity is adapted to compute a top-hash of the encrypted file—PFID—in case the FID is not known or uses a prior computed FID in case the FID is known and performs a proof-of-ownership-procedure for the encrypted data file to be stored by comparing the FID with the PFID or the prior computed FID and when the ownership of the data file has been proven, the FID being equal with the PFID is stored on the client together with said hash value.

According to an embodiment, proxy entity is provided, the proxy entity being characterized in that the proxy entity is adapted to generate a master encryption key wherein the master encryption key is a deterministic function of the data file to be stored based on a hash value of a hash-function performed on the data file to be stored by said client, to receive a top-hash of a computed hash-tree as file identification—FID—for the encrypted file, to check whether the FID is already known to the storage entity or not and in case the FID is not known, to receive the encrypted file from the client, to compute a top-hash of the encrypted file—PFID—in case the FID is not known or to use a prior computed FID in case the FID is known and to perform a proof-of-ownership-procedure for the data file to be stored by comparing the FID with the PFID or the prior computed FID and when the ownership of the data file has been proven, to indicate to the client that the FID being equal with the PFID.

According to embodiments of the invention, storage space when storing encrypted files can be reduced by client-driven deduplication of files.

According to embodiments of the invention, users can be enabled to fairly and securely share the savings of data deduplication in spite of a rational service provider which might not accurately report the deduplication patterns of the stored data.

According to embodiments of the invention, strong confidentiality can be guaranteed and protection against malicious users who might be interested in abusing a deduplication service can be enabled.

According to embodiments of the invention, an indexing of files based on a top hash of the encrypted file can be enabled with a key derived from a deterministic function ensuring that users cannot cheat by uploading files/their data not correctly encrypted.

According to embodiments of the invention, proof of ownerships can be easily performed by the proxy entity simply by checking that the proof of ownership matches the file identifier FID.

According to embodiments of the invention, an easy implementation is enabled since existing application programming interfaces API can be used provided by conventional service providers.

According to embodiments of the invention, an overhead incurred on the proxy entity for example in orchestrating data deduplication is minimized.

According to a preferred embodiment for performing step a) said client blinds said hash-value with an oblivious pseudo-random-function prior to transmitting the blinded value to the proxy entity. This enables in a fast and efficient way to blind the hash-value, thus hading the hash value from the proxy entity.

According to a further preferred embodiment after receiving the blinded value, the proxy entity signs the blinded hash-value and returns it to the client wherein the client then unblinds the signed value, performs the hash-function on the unblinded received value and uses the result as encryption key. This enables in an easy way providing a server-aided/proxy-aided key generation protocol between the client and the proxy entity. Since the master encryption key is a deterministic function of the data file to be stored the master encryption key is "bounded" to the data file and can be efficiently used when the deduplicating data files to be stored.

According to a further preferred embodiment the top hash is computed for a Merkle hash tree or a tiger hash tree. If the hash tree is the Merkle hash tree then a fast and efficient computing of the hash tree and therefore of the top hash can be performed since the Merkle hash tree is an example for a binary hash tree. Alternatively the tiger hash tree can be used using the crypto hash function "tiger". A tiger hash tree hashes for example on the level of the leaves data blocks of a data file each having 1024 bytes.

According to a further preferred embodiment upon a request of the client to the proxy entity to store the file on said storing entity, the proxy entity provides upload information to the client, wherein said upload information is only temporary valid. For example the proxy entity can issue a timed generate URL command enabling the client to upload the data onto its account within a certain time interval. A timed generateURL command results in a URL expiring after a specified period of time. This enables the proxy entity to recognize file uploads and to organize them without having to wait too long until the client uploads the file. If the client does not use the corresponding timed uploading information, then the client—when again trying to upload the file—has to reissue a corresponding request to the proxy entity.

According to a further preferred embodiment upon successful proof-of-ownership:

6a) In case the FID is not known, the FID and meta-data associated with the encrypted file is stored by the proxy entity, preferably including client information and the size of the encrypted file, 6b) In case the FID is known, client information is added to the meta-data associated with the stored encrypted data file with corresponding FID.

This enables in an easy and efficient way for example a later download of the data file or deletion of a data file using the meta-data associated with the former uploaded file.

According to a further preferred embodiment in case of 6b) the client deletes the local copy of the data file upon receiving information about successful proof-of-ownership. This saves resources on the client's side since when the client deletes the local copy of the data file, the client has only to store the FID and the original hash of the data file for later manipulation of the data file, for example downloading it again, deleting the data file or the like.

According to a further preferred embodiment for downloading a data file from the storage entity, the client submits the FID to the proxy entity and the proxy entity provides after successful check that the client information of the client matches to the meta-data associated to the data file with said FID, server download information to the client, preferably wherein the server download information are only temporary valid. This enables in an easy and efficient way a download of the data file requested by the clients preferably the proxy entity may note the number of download requests performed by each client for each file.

According to a further preferred embodiment for decrypting the downloaded data file with a decryption key, the client either uses a corresponding cached decryption key associated with the FID or the client performs step a) to acquire the corresponding decryption key. This enables in a flexible way to provide the client with the decryption key to decrypt the encrypted downloaded file. If the client has not stored the corresponding decryption key when having uploaded the data file, the client can request the corresponding decryption key using the master encryption key from the proxy entity again.

According to a further preferred embodiment in case the PFID does not match the FID the data file corresponding to the PFID is deleted from the storage entity. This ensures that only the files which have been requested by the client for storage are stored at the storage entity, e.g. a cloud storage, a server or the like. A misuse of the storage entity is therefore avoided, at least reduced.

According to a further preferred embodiment the directory operations on a file system of the client are performed locally on the client hidden from the proxy entity. When the client has a file system on which he operates directory operations involving the stored data file are hidden from the proxy entity and thus security of the client is enhanced. Directory operations are preferably comprising directory creation, directory renaming, etc.

According to a further preferred embodiment a data file is stored on the storage entity under a random identifier mapped to the FID. This further enhances the security, since random identifiers cannot be guessed by a client in order to download the file. Further the flexibility is enhanced, since random identifiers can be generated according to the needs of the storage entity for example.

According to a further preferred embodiment when a data file is indicated by a client to be deleted, the proxy entity renames the data file to another random identifier and provides upon a request for access to a renamed data file by another client, corresponding new access information associated to the FID and the renamed data file. This enables in an easy way to delete files in particular in connection with storage providers not supporting URL commands for file creation e.g. only provide non-timed URL-based file download. When a user requests to delete a file, the proxy for example manually renames the data file to another random and unpredictable identifier for said data file. Other legitimate clients who require access to said data file then contact the proxy entity again who informs them of for example a new URL corresponding to the renamed data file.

A number of clients C1, C2, . . . —in FIG. 1 only C2 is shown—are interested in storing their files at a storage provider S. Preferably the storage provider S exposes to its clients C1, C2, . . . a standard interface providing a plurality of simple operations such as storing a file, retrieving a file, deleting a file, generating a URL for sending HTTP commands for storage/retrieval, etc. In case the storage provider S is a commodity cloud service provider he may expose an even more simpler interface for example that does not allow storing a file using a URL.

Clients C1, C2, . . . are interested in storing their files at low cost. In the FIGURE is shown a gateway or proxy entity P which owns an account hosted by the storage provider S and performs cross-user file-based deduplication of files. It is also possible that users, i.e. clients C1, C2, . . . coordinate their file uploads to the storage provider S prior to storing their data on the storage provider S. Such a decentralized coordination however requires interaction among the users respectively clients and is unlikely to scale as a number of users/clients storing the same data increases.

The gateway P is preferably a logically centralized entity and can be easily instantiated using any number of distributed servers for example. Similar to conventional operations of existing cloud storage providers, the storage provider S for example charges the proxy entity P according to the total storage space that the proxy entity P and the clients C1, C2, . . . are consuming and the total number of bytes that they download. In turn the gateway P charges the clients C1, C2, . . . according to the data that they are respectively storing after the data has undergone deduplication and to the total number of bytes each client C1, C2, . . . has downloaded.

Further it is assumed that the clients C1, C2, . . . and the gateway P share user keys and credentials, for example certificates or the like. In particular all communication between a client C1, C2, . . . and the gateway P is authenticated and preferably encrypted. It is also assumed that a secure encryption procedure ENC and a cryptographic hash function H is provided.

There are number of problems which can arise:

Access control: Since the gateway P owns the account on the storage entity S the gateway P needs to effectively manage access rights of users/clients onto the stored files. This preferably includes granting/revoking read rights for users on the files and accurately measuring user access patterns for billing purposes later on. The gateway P also needs to ensure that only legitimate users/clients who own and have subscribed to a given file can access the file.

Malicious users: The gateway P additionally needs to prevent abuse by malicious users who can deviate from the protocol and for example upload ill-constructed content, encrypt their data using unknown keys to prevent honest users from later on accessing their files, etc. This process has to be efficient for example users cannot constantly download and decrypt uploaded files in order to check their correctness.

Curious gateway P and storage provider S: Even further both the gateway P and the storage provider S should not be able to acquire any information about the contents of the file stored on the storage provider Seven if they collude and put their information together. Of course both the gateway P and the storage provider S have to know the file sizes and the download patterns of the files in order to perform a correct accounting.

The system shown in FIG. 1 takes the above into account and performs the following steps:

When a client wishes to a upload a new file fi onto the storage entity S, the client Ci issues an upload request to the proxy entity P. Subsequently, the client Ci and the proxy entity P start executing the server-aided key generation protocol. More specifically, the client Ci blinds H(fi) with $r^e$, where r is a random number, and e denotes the public key of P and d denotes the private key. Upon reception of $H(fi)r^e$, the proxy entity P signs it and returns the signature $H(fi)^d r$ to the client C; the latter unblinds it and computes the key $K=H(H(fi)^d)$. This procedure is not bound to a particular Oblivious PRF protocol and can rely on other protocols which offer similar guarantees. For example, it can be instantiated using blind RSA or blind BLS signatures.

The client Ci then encrypts the file fi using an encryption algorithm Enc under a key K, computes and sends to the gateway P the Merkle root of the Merkle tree over the encrypted file, FID=MTEnc(K; fi). Subsequently, the gateway P checks if any other client has previously stored FID. If the FID has not been stored before: In this case, the gateway P issues a timed generateURL command allowing the client Ci to upload the data file onto its account within a time interval d, e.g. using a timed generateURL command resulting in a URL which expires after the specified period of time. After the upload of the encrypted data file Enc(K; fi) terminates, the gateway P accesses the storage provider S and computes the Merkle root of the stored file, and verifies that it matches FID. If the verification matches, the gateway P stores metadata associated with the uploaded file in a newly generated structure indexed by FID: this includes preferably the ID of the client Ci, the size of the underlying file Enc(K; fi) (in bytes). Otherwise, if the Merkle root of the stored file does not match FID, the gateway P deletes the data file and adds the ID of the client Ci to a blacklist (e.g., the gateway P can ban further requests from client Ci).

FID has been stored before: In this case, the gateway P requests that the client Ci proves that it owns the file FID.

For that purpose, the gateway P and the client Ci execute a proof-of-work PoW protocol. In essence, the gateway P chooses a random number u of leaf indexes of the Merkle tree of encrypted file Enc(K; fi), and asks the client Ci for the sibling paths of all the u leaves; the gateway P accepts if all the sibling paths are valid with respect to the Merkle root FID. If this PoW verification passes, the gateway P appends the ID of the client Ci to the file metadata structure with index FID, and sends an ACK to the client Ci. In turn, the client Ci deletes the local copy of the file and only needs to store FID and the original hash of the file H(fi).

To download a file with index FID, a client Ci submits a corresponding FID to the gateway P; the latter checks that the client Ci is a member of the user list added to the metadata structure of FID. If so, the gateway P generates a timed URL allowing the client Ci to download the requested file from the storage provider S. Additionally it is preferably assumed that the gateway P notes the number of download requests performed by each client for each file. If the client Ci did not cache the decryption key associated with FID, then the client Ci can use H(fi) to acquire the corresponding key by executing the server-aided/proxy-aided generation protocol with the gateway P.

When a client Ci wants to delete a file with identification FID, it informs the gateway P. The gateway P marks the client Ci for deletion from FID in the subsequent epoch.

Preferably the clients directory structures are hidden from the gateway P by working on a single directory structure hosted within the storage providers account on the cloud. This has the benefit of reducing the overhead beared by the gateway P, i.e. no path related overhead, but relies on the clients C1, C2, . . . storing their directory structure locally and for example storing their encrypted directory structure at the gateway P. Directory operations such as directory creation, directory renaming, etc. are locally maintained by the software client of the users. Local directories comprise pointers to the client files outsourced to the cloud, which enable the local client to perform operations such as directory listing and file renaming without the need to contact the gateway P, thereby minimizing the overhead incurred on the gateway P. Only operations that affect the client files stored on the cloud (e.g., filename search, file deletion/creation) are transmitted to the gateway P. By hiding the directory structure from the gateway P the interactions with the gateway P and the clients C1, C2, . . . are minimized enabling maximum user privacy since the directory structures may leak considerable information about the files stored therein and consequently about the underlying user profile. Preferably the directory structure particular to each user/client C1, C2, . . . is stored encrypted at the gateway P thus enabling users to synchronize their directories across multiple devices.

When a cloud service provider S does not support URL commands for file creation for example and only provide non-timed URL-based file download then preferably an URL-based PUT is replaced by the clients C1, C2, . . . uploading the data file to the gateway P which in turn uploads the file to the storage provider S. Since the gateway P has to compute the Merkle tree over the uploaded file this is preferably performed before the gateway P uploads the file to the storage provider S therefore reducing the performance penalty incurred on the gateway P.

The files can also be stored on random identifiers and can be accessed by means of permanent URLs which map to the corresponding FID. When the user/client requests to delete a file, the gateway P has to manually rename the file to another random and unpredictable identifier. Other legitimate clients C1, C2, . . . requiring access to the file have to contact the gateway P who informs them of the new URL corresponding to the renamed file object.

Embodiments of the present invention can enable fine-grained access control on shared files preferably relying on the notion of self-expiring URL when accessing content. Whenever a user wishes to access a given resource the gateway generates the URL for that resource on the fly which expires after the period of time.

Embodiments of the present invention can enable an easy implementation since conventional cloud application programming interfaces support dynamic generation of such expiring resources URLs.

Embodiments of the present invention can ensure not only that the gateway can restrict access to the data stored on the cloud but can also enable the gateway to keep track of the access pattern of its users for example to be used in billing later.

Embodiments of the present invention can provide an oblivious server-aided or gateway-aided encryption key generation to ensure that the stored files are encrypted with keys that are dependent on both the hash of the file and the gateways secret. This enhances the security against brute force search attacks when the message content is predictable, also ensuring that a curious gateway/storage provider which does not know the file hash cannot acquire the necessary keys to decrypt them.

Embodiments of the present invention can provide a proof of ownership over the encrypted file to protect against malicious users who otherwise have obtained the file hash, for example by theft or malware but do not possess the full file. Besides proving that a given user is indeed in possession of the full file this guarantees to a user that the cloud stores a file which is correctly encrypted.

Embodiments of the present invention can also provide an indexing of files based on the Merkle root of the encrypted file with the key derived from an oblivious pseudo-random function protocol. This ensures that users cannot cheat by uploading files that are not correctly encrypted and that a proof of ownerships can be easily performed by the proxy/gateway simply by checking that the proof matches the file identifier.

An embodiment of the present invention provides a method comprising the steps of:
1) Executing a server-aided key generation protocol between users and the proxy to output encryption key, preferably using an oblivious pseudo-random function,
2) Encrypting by the user the file with the obtained encryption key and computing the Merkle root of the encrypted file as FID,
3) If FID is not yet known, the encrypted file is uploaded by the user. The proxy obtains the encrypted file, and also computes a Merkle root and data needed for a proof of ownership,
4) If the file FID is already in the Server/storage entity, the proxy knows data to perform a proof of ownership of the encrypted file with the user.

Embodiments of the present invention may have, inter alia, the following advantages: efficient enforcement of fine-grained access control over deduplicated files, support of strong confidentiality, resistance against malicious users, and protection from a rational gateway which attempts to overcharge users. Further, embodiments of the present invention may provide cheaper storage costs than conventional commodity storage servers without compromising the confidentiality of the data or the performance of the system. For example, embodiments of the present invention can incur considerable storage cost savings on cloud users of 30% compared to conventional commodity storage services for a number of realistic profiles of users.

Embodiments of the present invention can be transparent from the perspective of the users and the storage provider. Embodiments of the present invention could be implemented within existing application programming interfaces API provided by conventional service providers without deteriorating the performance witnessed by users when compared this conventional solutions where users directly interface with this storage provider. Embodiments of the present invention scale with the number of users, the file size and, the number of uploaded files. In particular, the overhead incurred on the gateway P in orchestrating data deduplication can be minimal while incurring tolerable overhead on users when verifying for example their bills at the end of every time epoch.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for storing a data file of a client on a storage entity, the method comprising:
   a) generating, by a proxy entity, a master encryption key, wherein the master encryption key is a deterministic function of the data file based on a hash value of a hash-function performed on the data file,
   b) encrypting, by the client, the data file using the master encryption key to produce an encrypted file,
   c) computing a hash-tree for the encrypted file and using a top-hash of the hash-tree as a file identification (FID) for the encrypted file,
   d) determining, by the proxy entity, whether the FID is already known to the storage entity,
   e) if the FID is not already known to the storage entity:
      uploading, by the client, the encrypted file to the storage entity and to the proxy entity,
      computing, by the proxy entity, a top-hash of the encrypted file (PFID),
      performing a proof-of-ownership procedure for the encrypted data file to be stored by comparing the FID with the PFID, and
      when the ownership of the data file has been proven, storing the FID being equal with the PFID at the client together with the hash value, and
   f) if the FID is already known to the storage entity:
      performing a proof-of-ownership-procedure for the encrypted data file to be stored by comparing the FID with a prior computed FID, and
      when the ownership of the data file has been proven, storing the FID at the client together with the hash value.

2. The method according to claim 1, wherein for performing step a) the client blinds the hash-value with an oblivious pseudo-random-function prior to transmitting the blinded hash value to the proxy entity.

3. The method according to claim 2, wherein after receiving the blinded hash value, the proxy entity signs the blinded hash-value and returns it to the client, wherein the client then unblinds the signed value, performs the hash-function on the unblinded received value and uses the result as the master encryption key.

4. The method according to claim 1, wherein the top-hash is computed for a Merkle hash tree or tiger hash tree.

5. The method according to claim 1, wherein upon request of the client to the proxy entity to store the data file on the storage entity, the proxy entity provides upload information to the client, wherein the upload information is only temporarily valid.

6. The method according to claim 1, wherein upon successful proof-of-ownership:
6a) if the FID is not known, the FID and meta-data associated with the encrypted file are stored by the proxy entity including client information and a size of the encrypted file,
6b) if the FID is known, client information is added to meta-data associated with the stored encrypted data file with corresponding FID.

7. The method according to claim 6, wherein in case of 6b) the client deletes a local copy of the data file upon receiving information about successful proof-of-ownership.

8. The method according to claim 1, wherein for downloading a data file from the storage entity, the client submits the FID to the proxy entity, and the proxy entity provides after successful check that the client information of the client matches to the meta-data associated the data file with the FID, server download information to the client, wherein the server download information is only temporary valid.

9. The method according to claim 8, wherein for decrypting the downloaded data file with a decryption key the client either uses a corresponding cached decryption key associated with the FID or the client performs step a) to acquire the corresponding decryption key.

10. The method according to claim 1, wherein if the PFID does not match the FID, the data file corresponding to the PFID is deleted from the storage entity.

11. The method according to claim 1, wherein the directory operations on a file system of the client are performed locally on the client hidden from the proxy entity.

12. The method according to claim 1, wherein a data file is stored on the storage entity under a random identifier mapped to the FID.

13. The method according to claim 12, wherein when a data file is indicated by a client to be deleted, the proxy entity renames the data file to another random identifier and provides upon a request for access to the renamed data file by another client a corresponding new access information associated to the FID and the renamed data file.

14. A system for storing a data file of a client on a storage entity, the system comprising:
a proxy entity, wherein the proxy entity is adapted to generate a master encryption key, wherein the master encryption key is a deterministic function of the data file based on a hash value of a hash-function performed on the data file by the client,
wherein the client is adapted to encrypt the data file to be stored using the provided master encryption key, and to compute a hash-tree for the encrypted file, and
wherein the proxy entity is further adapted to receive a top-hash of the computed hash-tree as a file identification (FID) for the encrypted file, to check whether the FID is already known to the storage entity or not,
wherein if the FID is not known to the storage entity, the client is adapted to upload the encrypted file to the storage entity and to the proxy entity and the proxy entity is adapted to compute a top-hash of the encrypted file (PFID), to perform a proof-of-ownership-procedure for the encrypted data file to be stored by comparing the FID with the PFID, and when the ownership of the data file has been proven, the FID being equal with the PFID is stored on the client together with the hash value, and
wherein if the FID is known to the storage entity, the proxy entity is adapted to perform a proof-of-ownership procedure for the encrypted data file to be stored by comparing the FID with a prior computed FID, and when the ownership of the data file has been proven, the FID is stored on the client together with the hash value.

15. A proxy entity connectable to a storage entity and a client the proxy entity being adapted to:
generate a master encryption key, wherein the master encryption key is a deterministic function of a data file to be stored based on a hash value of a hash-function performed on the data file to be stored,
receive a top-hash of a computed hash-tree as a file identification (FID) for the encrypted file, to determine whether the FID is already known to the storage entity or not,
if the FID is not known, receive the encrypted file from the client, compute a top-hash of the encrypted file (PFID), perform a proof-of-ownership procedure for the data file to be stored by comparing the FID with the PFID, and when ownership of the data file has been proven to indicate to the client that the FID is equal with the PFID, and
in case the FID is known, perform a proof-of-ownership-procedure for the data file by comparing the FID with a prior computed FID.

* * * * *